(12) United States Patent
Sometani et al.

(10) Patent No.: US 9,719,419 B2
(45) Date of Patent: Aug. 1, 2017

(54) GAS TURBINE COMBUSTOR WITH TOP HAT NOZZLE ARRANGEMENTS

(75) Inventors: Satoshi Sometani, Tokyo (JP); Satoshi Takiguchi, Tokyo (JP); Shigemi Mandai, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 622 days.

(21) Appl. No.: 13/817,384

(22) PCT Filed: Feb. 28, 2012

(86) PCT No.: PCT/JP2012/054913
§ 371 (c)(1),
(2), (4) Date: Feb. 15, 2013

(87) PCT Pub. No.: WO2012/124467
PCT Pub. Date: Sep. 20, 2012

(65) Prior Publication Data
US 2013/0139511 A1    Jun. 6, 2013

(30) Foreign Application Priority Data

Mar. 16, 2011    (JP) .................................. 2011-058588

(51) Int. Cl.
*F02C 7/00*    (2006.01)
*F23R 3/10*    (2006.01)
(Continued)

(52) U.S. Cl.
CPC ................ *F02C 7/00* (2013.01); *F23R 3/10* (2013.01); *F23R 3/286* (2013.01); *F23R 3/343* (2013.01);
(Continued)

(58) Field of Classification Search
CPC .... F23R 3/36; F23R 3/286; F23R 3/20; F23R 3/34; F23R 3/28; F23R 3/46; F23R 3/54;
(Continued)

(56) References Cited

U.S. PATENT DOCUMENTS 5,450,725 A * 9/1995 Takahara et al. ................ 60/737
5,943,866 A * 8/1999 Lovett ..................... F23R 3/286
431/114

(Continued)

FOREIGN PATENT DOCUMENTS

CN    101050867 A    10/2007
EP    1434007 A2    6/2004
(Continued)

OTHER PUBLICATIONS

International Search Report of PCT/JP2012/054913, mailing date of May 22, 2012.
(Continued)

*Primary Examiner* — Pascal M Bui Pho
*Assistant Examiner* — Alain Chau
(74) *Attorney, Agent, or Firm* — Westerman, Hattori, Daniels & Adrian, LLP

(57) ABSTRACT

A gas turbine combustor includes: an external cylinder (31); an inner cylinder (32) provided inside the external cylinder (31) to form an air passage (30) between the external cylinder (31) and the inner cylinder (32); a pilot nozzle (35) provided in a center part of the inner cylinder (32) along a direction of a combustor axis (S); a plurality of main nozzles (36) provided on an inner peripheral surface of the inner cylinder (32) along a circumferential direction thereof so as to surround the pilot nozzle (35), the plurality of main nozzles (36) premixing fuel with combustion air introduced to the air passage (30) and ejecting the fuel into the inner cylinder (32); and a top hat nozzle (41) provided inside the
(Continued)

air passage (30) across a circumferential direction to mix fuel with the combustion air prior to reaching the plurality of main nozzles (36).

11 Claims, 11 Drawing Sheets

(51) Int. Cl.
*F23R 3/54* (2006.01)
*F23R 3/28* (2006.01)
*F23R 3/34* (2006.01)

(52) U.S. Cl.
CPC ...... *F23R 3/54* (2013.01); *F23R 2900/00014* (2013.01)

(58) Field of Classification Search
CPC ...... F23R 3/30; F23R 3/10; F02C 3/34; F02C 7/22; F02C 7/222; F02C 7/24; F23C 2900/07001; F05B 2260/962
USPC ............................ 60/740, 746, 747, 748, 737
See application file for complete search history.

(56) References Cited

U.S. PATENT DOCUMENTS

| | | | | |
|---|---|---|---|---|
| 6,430,930 | B1* | 8/2002 | Andersson | 60/725 |
| 7,578,130 | B1* | 8/2009 | Kraemer et al. | 60/737 |
| 8,281,596 | B1* | 10/2012 | Rohrssen et al. | 60/747 |
| 2002/0011070 | A1* | 1/2002 | Mandai | F23R 3/14 60/725 |
| 2004/0148936 | A1* | 8/2004 | Moriya et al. | 60/737 |
| 2006/0101814 | A1* | 5/2006 | Saitoh et al. | 60/377 |
| 2009/0077972 | A1 | 3/2009 | Singh | |
| 2010/0018208 | A1* | 1/2010 | Ritland | F02C 7/222 60/737 |
| 2010/0018209 | A1* | 1/2010 | Ramier | F23R 3/286 60/740 |
| 2010/0275603 | A1* | 11/2010 | Saito et al. | 60/737 |
| 2011/0239652 | A1* | 10/2011 | McMahan et al. | 60/737 |
| 2011/0239653 | A1* | 10/2011 | Valeev et al. | 60/740 |
| 2012/0085100 | A1* | 4/2012 | Hughes et al. | 60/776 |
| 2012/0167544 | A1* | 7/2012 | Toronto | F23R 3/16 60/39.52 |
| 2012/0297786 | A1* | 11/2012 | Crawley et al. | 60/772 |

FOREIGN PATENT DOCUMENTS

| | | | | |
|---|---|---|---|---|
| JP | 08-135970 | A | 5/1996 | |
| JP | 09-166326 | A | 6/1997 | |
| JP | 09-184629 | A | 7/1997 | |
| JP | 10-318541 | A | 12/1998 | |
| JP | 2000-500222 | A | 1/2000 | |
| JP | 2002-522741 | A | 7/2002 | |
| JP | 2003-090535 | A | 3/2003 | |
| JP | 2003-120934 | A | 4/2003 | |
| JP | 2004-077076 | A | 3/2004 | |
| JP | 2004077076 | A * | 3/2004 | ............... F23R 3/16 |
| JP | 2005-195284 | A | 7/2005 | |
| JP | 2005195284 | A * | 7/2005 | ............... F23R 3/28 |
| JP | 2005-233574 | A | 9/2005 | |
| JP | 2005233574 | A * | 9/2005 | ............... F23R 3/34 |
| JP | 2009-041848 | A | 2/2009 | |
| JP | 2009-074792 | A | 4/2009 | |
| JP | 2009-156542 | A | 7/2009 | |
| JP | 2009-281720 | A | 12/2009 | |
| JP | 2010-085083 | A | 4/2010 | |
| WO | 97/17574 | A1 | 5/1997 | |

OTHER PUBLICATIONS

Written Opinion of PCT/JP2012/054913, mailing date of May 22, 2012.
Japanese Office Action dated Mar. 11, 2014, issued in corresponding Japanese application No. 2013-504639, w/ English translation (4 pages).
English Translation of Written Opinion of the ISA dated May 22, 2012, in corresponding International Application No. PCT/JP2012/054913. (5 pages).
Korean Office Action dated Nov. 5, 2014,issued in corresponding Korean Application No. 10-2013-7003744; w/ partial English Translation. (3 pages).
Extended European Search Report dated Sep. 9, 2014, issued in corresponding European Patent Application No. 12757130.5 (7 pages).
Chinese Office Action dated Jun. 25, 2014, issued in corresponding Chinese Patent Application No. 201280002443.3 with English translation (13 pages).
Notification of Grant of Invention Patent dated Dec. 4, 2014, issued in corresponding Chinese Patent Application No. 201280002443.3, with English Translation (2 pages).
Notification of Completion of Formalities for Registration dated Dec. 4, 2014, issued in Chinese Patent Application No. 201280002443.3, with English Translation (2 pages).

* cited by examiner

GAS TURBINE COMBUSTOR WITH TOP HAT NOZZLE ARRANGEMENTS

FIELD

The present invention relates to a gas turbine combustor employing a premixed combustion system and a gas turbine applying the combustor.

BACKGROUND

A gas turbine combustor employing a premixed combustion system combusts fuel and compressed air that are premixed, and is effective in reducing NOx emission because the fuel concentration is homogenized. Such gas turbine combustor employing the premixed combustion system has been known conventionally (refer to Patent Literatures 1 to 4, for example).

The homogenization of the fuel concentration is effective in reducing the NOx (nitrogen oxide) emission. On the other hand, a mixed state of premixed air in each main nozzle would be substantially the same, thereby causing each main burner to have the same combustion state and a combustor to have the same heat distribution all around in a central axis direction of the combustor. As a result, there would be a certain region in the combustor where the heat quantity is large. Such concentrated heat gives rise to a new problem that the combustion oscillation is more likely to occur.

Now, a gas turbine combustor (a combustor) such as the one described in Patent Literature 5 has conventionally been provided to prevent the occurrence of combustion oscillation. The gas turbine combustor includes: a cylindrical premixing chamber provided inside a casing; a combustion chamber being communicated with the premixing chamber; an air current introduction part for changing the direction of an air current flowing in an air inflow part and introducing the air current into the premixing chamber; a pilot nozzle provided on a central axis of the premixing chamber; and main premixing nozzles extending substantially in parallel with the pilot nozzle and provided at equal center angle intervals in the premixing chamber. The main premixing nozzle includes: a fuel rod in which fuel flows along a central axis thereof; and downstream-side fuel injection pegs attached to the fuel rod at equal center angle intervals and extending outward in a radial direction. Moreover, upstream-side fuel injection pegs are disposed on the upstream side of the premixing chamber at a plurality of stages along the air current direction.

CITATION LIST

Patent Literature

Patent Literature 1: Japanese Patent Application Laid-open No. 2009-074792
Patent Literature 2: Japanese Patent Application Laid-open No. 2010-085083
Patent Literature 3: Japanese National Publication of International Patent Application No. 2000-500222
Patent Literature 4: Japanese Patent Application Laid-open No. 2009-041848
Patent Literature 5: Japanese Patent Application Laid-open No. 2005-233574

SUMMARY

Technical Problem

The gas turbine combustor described in Patent Literature 5 is adapted to prevent only specific combustion oscillation, namely, the combustion oscillation with the frequency corresponding to each stage by including the fuel injection pegs in the plurality of stages.

The present invention has been proposed to solve the aforementioned problems. An object of the present invention is to provide a gas turbine combustor and a gas turbine capable of suppressing the occurrence of combustion oscillation for a wide range of frequencies while maintaining the low NOx emission.

Solution to Problem

In order to achieve the object, a gas turbine combustor includes: an external cylinder; an inner cylinder provided inside the external cylinder to form an air passage between the external cylinder and the inner cylinder; a pilot nozzle provided in a center part of the inner cylinder along a direction of a combustor axis; a plurality of main nozzles provided on an inner peripheral surface of the inner cylinder along a circumferential direction thereof so as to surround the pilot nozzle, the main nozzle premixing fuel with combustion air introduced to the air passage and ejecting the fuel into the inner cylinder; and a top hat nozzle provided inside the air passage across a circumferential direction to mix fuel with the combustion air prior to reaching the main nozzle, a position of the top hat nozzle from which the fuel is ejected being varied along the direction of the combustor axis.

According to the gas turbine combustor, the variation in the position from which the fuel is ejected in the combustor axis direction generates a number of combustion oscillations that would be present with different frequencies, thereby momentarily causing a phase difference in the frequencies of the combustion oscillations. As a result, the mixed state of the premixed air changes momentarily and, at the same time, the combustion state of each main nozzle on the downstream side changes momentarily, whereby the heat distribution of the combustor all around in the combustor axis direction changes momentarily. For this reason, the concentrated heating in the combustor can be suppressed so that the combustion oscillation can be suppressed. At the same time, the fuel concentration would be homogenized since the mixed state of the premixed air is uniform in a predetermined time unit. The combustion oscillation of a wide range of frequencies can thus be suppressed while maintaining the low NOx emission.

In the gas turbine combustor, the top hat nozzle is provided in plurality in a circumferential direction and disposed in a manner that a position of the top hat nozzle is varied regularly in the combustor axis direction.

According to the gas turbine combustor, in addition to the aforementioned effect that the combustion oscillation of a wide range of frequencies can be suppressed while maintaining the low NOx emission by the top hat nozzle, a manufacturing cost of the gas turbine combustor can be reduced since the gas turbine combustor is easily manufactured owing to the regular arrangement thereof.

In the gas turbine combustor, the top hat nozzle is provided in plurality in a circumferential direction and disposed in a manner that a position of the top hat nozzle is varied irregularly in the combustor axis direction.

According to the gas turbine combustor, in addition to the aforementioned effect that the combustion oscillation of a wide range of frequencies can be suppressed while maintaining the low NOx emission by the top hat nozzle, the suppression of the combustion oscillation of a wide range of frequencies can be prominently obtained as an effect because a greater number of the combustion oscillations with different frequencies would be present causing subtler phase differences in the frequencies of the combustion oscillations to occur, whereby the combustion oscillation of a wider range of frequencies including the specific combustion oscillation can be suppressed.

In the gas turbine combustor, the top hat nozzle forms a top hat nozzle group in which the plurality of top hat nozzles is disposed in the circumferential direction at a position varied in the combustor axis direction, and the top hat nozzle group is disposed in plurality in the combustor axis direction.

According to the gas turbine combustor, the combustion oscillation in a wide range of frequencies can be suppressed while maintaining the low NOx emission by the top hat nozzle group formed of the plurality of top hat nozzles provided in the circumferential direction and disposed at different positions in the combustor axis direction. The top hat nozzle group being disposed in plurality in the combustor axis direction, the effect of the suppression of the combustion oscillation in a wide range of frequencies can be multiplied and obtained prominently.

In the gas turbine combustor, the top hat nozzle is provided in plurality in a circumferential direction, includes a fuel ejection port for ejecting fuel, the fuel ejection port being provided midway in the combustor axis direction to which the top hat nozzle extends, and is disposed in a manner that a position of the fuel ejection port is varied regularly in the combustor axis direction.

According to the gas turbine combustor, in addition to the aforementioned effect that the combustion oscillation of a wide range of frequencies can be suppressed while maintaining the low NOx emission by the top hat nozzle, the manufacturing cost of the gas turbine combustor can be reduced since the gas turbine combustor is easily manufactured owing to the regular arrangement thereof. Since the top hat nozzle extends in the combustor axis direction, moreover, the position of the fuel ejection port in the combustor axis direction can be varied by changing the arrangement of the top hat nozzle in the axis direction, thereby allowing a component to be shared and standardized to prevent the increase in the manufacturing cost of the gas turbine combustor.

In the gas turbine combustor, the top hat nozzle is provided in plurality in a circumferential direction, includes a fuel ejection port for ejecting fuel, the fuel ejection port being provided midway in the combustor axis direction to which the top hat nozzle extends, and is disposed in a manner that a position of the fuel ejection port is varied irregularly in the combustor axis direction.

According to the gas turbine combustor, in addition to the aforementioned effect that the combustion oscillation of a wide range of frequencies can be suppressed while maintaining the low NOx emission by the top hat nozzle, the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed. Since the top hat nozzle extends in the combustor axis direction, moreover, the position of the fuel ejection port in the combustor axis direction can be varied by changing the arrangement of the top hat nozzle in the axis direction, thereby allowing a component to be shared and standardized and preventing the increase in the manufacturing cost of the gas turbine combustor.

In the gas turbine combustor, the fuel ejection port is disposed in plurality in the combustor axis direction.

According to the gas turbine combustor, the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed.

In the gas turbine combustor, the top hat nozzle is formed annularly along a circumferential direction, provided with a plurality of fuel ejection ports in the circumferential direction for ejecting fuel, and disposed in a manner that a position of the fuel ejection port is varied regularly in the combustor axis direction.

According to the gas turbine combustor, in addition to the aforementioned effect that the combustion oscillation of a wide range of frequencies can be suppressed while maintaining the low NOx emission by the top hat nozzle, the manufacturing cost of the gas turbine combustor can be reduced since the gas turbine combustor is easily manufactured owing to the regular arrangement thereof. Moreover, the designing freedom in the arrangement of the fuel ejection port in the circumferential direction would increase since the top hat nozzle is formed annularly.

In the gas turbine combustor, the top hat nozzle is disposed in plurality in the combustor axis direction.

According to the gas turbine combustor, the suppression of the combustion oscillation of a wide range of frequencies can be prominently obtained as an effect because a greater number of the combustion oscillations of different frequencies would be present causing subtler phase differences in the frequencies of the combustion oscillations, whereby the combustion oscillation of a wider range of frequencies including the specific combustion oscillation can be suppressed.

In the gas turbine combustor, the top hat nozzle is formed annularly along a circumferential direction, provided with a plurality of fuel ejection ports in the circumferential direction for ejecting fuel, disposed in plurality in the combustor axis direction, and disposed such that a position of the fuel ejection ports in the circumferential direction is mutually differed in an aspect that a position of the fuel ejection ports in the combustor axis direction is mutually varied.

According to the gas turbine combustor, in addition to the aforementioned effect that the combustion oscillation of a wide range of frequencies can be suppressed while maintaining the low NOx emission by the top hat nozzle, the manufacturing cost of the gas turbine combustor can be reduced since the gas turbine combustor is easily manufactured owing to the regular arrangement thereof. Moreover, the designing freedom in the arrangement of the fuel ejection port in the circumferential direction would increase since the top hat nozzle is formed annularly.

In the gas turbine combustor, the top hat nozzle has a vane form in an aspect of rectifying the combustion air introduced to the air passage, includes a fuel ejection port for ejecting fuel, is provided in plurality in a circumferential direction, and is disposed in a manner that a position of the fuel ejection port is varied regularly in the combustor axis direction.

According to the gas turbine combustor, in addition to the aforementioned effect that the combustion oscillation of a wide range of frequencies can be suppressed while maintaining the low NOx emission by the top hat nozzle, the manufacturing cost of the gas turbine combustor can be reduced since the gas turbine combustor is easily manufactured owing to the regular arrangement thereof.

In the gas turbine combustor, the top hat nozzle has a vane form in an aspect of rectifying the combustion air introduced to the air passage, includes a fuel ejection port for ejecting fuel, is provided in plurality in a circumferential direction, and disposed in a manner that a position of the fuel ejection port is varied irregularly in the combustor axis direction.

According to the gas turbine combustor, in addition to the aforementioned effect that the combustion oscillation of a wide range of frequencies can be suppressed while maintaining the low NOx emission by the top hat nozzle, the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed.

In the gas turbine combustor, the fuel ejection port is disposed in plurality in the combustor axis direction.

According to the gas turbine combustor, the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed.

In order to achieve the object, a gas turbine of the present invention includes the above gas turbine combustor.

According to the gas turbine, the combustion oscillation of a wide range of frequencies can be suppressed while maintaining the low NOx emission. As a result, the gas turbine can be operated while producing low NOx emission and less combustion oscillation.

Advantageous Effects of Invention

According to the present invention, the combustion oscillation of a wide range of frequencies can be suppressed while maintaining the low NOx emission.

DESCRIPTION OF EMBODIMENTS

Embodiments according to the present invention will be described below with reference to the drawings. Note that the present invention is not to be limited by the embodiments described below, and a component therein includes a component that is replaceable by those skilled in the art and is simple, or that is substantially identical to the component described in the embodiments.

Figure 1:
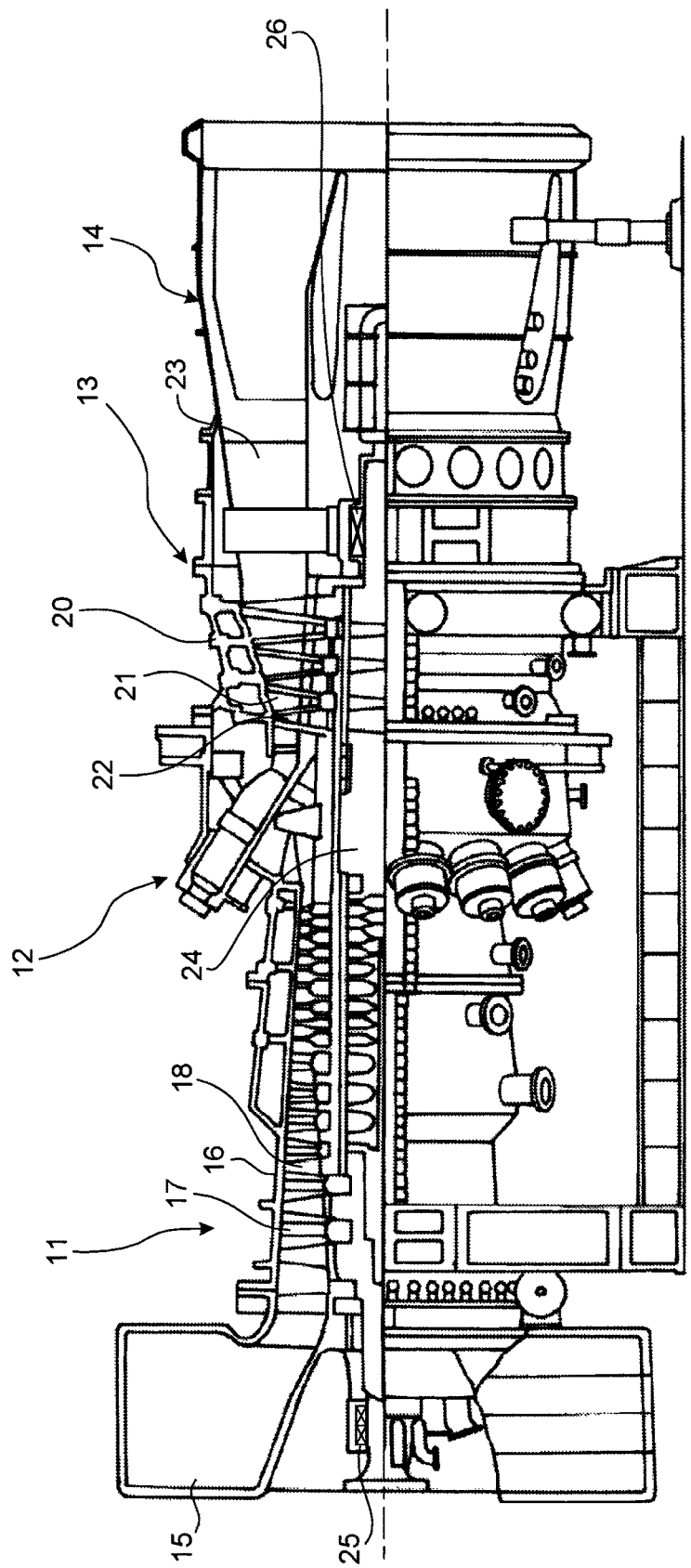
FIG. 1 is a schematic block diagram of a gas turbine.

FIG. 1 is a schematic block diagram of a gas turbine. As illustrated in FIG. 1, the gas turbine includes a compressor 11, a gas turbine combustor (hereinafter referred to as a combustor) 12, a turbine 13, and a flue gas chamber 14, the turbine 13 being connected to a generator that is not shown. The compressor 11 has an air intake port 15 for taking in air, while a plurality of compressor vanes 17 and turbine blades 18 are disposed alternately in a compressor compartment 16. The combustor 12 supplies fuel to the compressed air (combustion air) compressed in the compressor 11 and ignites the fuel by a burner for combustion. The turbine 13 includes a plurality of turbine vanes 21 and turbine blades 22 disposed alternately in a turbine compartment 20. The flue gas chamber 14 has a flue gas diffuser 23 provided consecutively to the turbine 13. Moreover, a rotor (turbine shaft) 24 is positioned to pass through center parts of the compressor 11, the combustor 12, the turbine 13, and the flue gas chamber 14, where an end of the rotor 24 on the compressor 11 side is rotatably supported by a shaft bearing 25, and an end of the rotor 24 on the flue gas chamber 14 side is rotatably supported by a shaft bearing 26. A plurality of disk plates is fixed to the rotor 24 which is connected to the respective turbine blades 18 and 22, and the end of the rotor 24 on the flue gas chamber 14 side is connected to a driving shaft of the generator that is not shown.

Therefore, the air taken in from the air intake port 15 of the compressor 11 is compressed by passing through the plurality of turbine vanes 21 and turbine blades 22 to be high-temperature, high-pressure compressed air, to which a predetermined fuel is supplied in the combustor 12 for combustion. A high-temperature, high-pressure combustion gas that is a working fluid produced by the combustion in the combustor 12 drives and rotates the rotor 24 by passing through the plurality of turbine vanes 21 and turbine blades 22 constituting the turbine 13, thereby driving the generator connected to the rotor 24. On the other hand, the flue gas is converted to static pressure by the flue gas diffuser 23 in the flue gas chamber 14 before being discharged into the atmosphere.

[First Embodiment]

Figure 2:
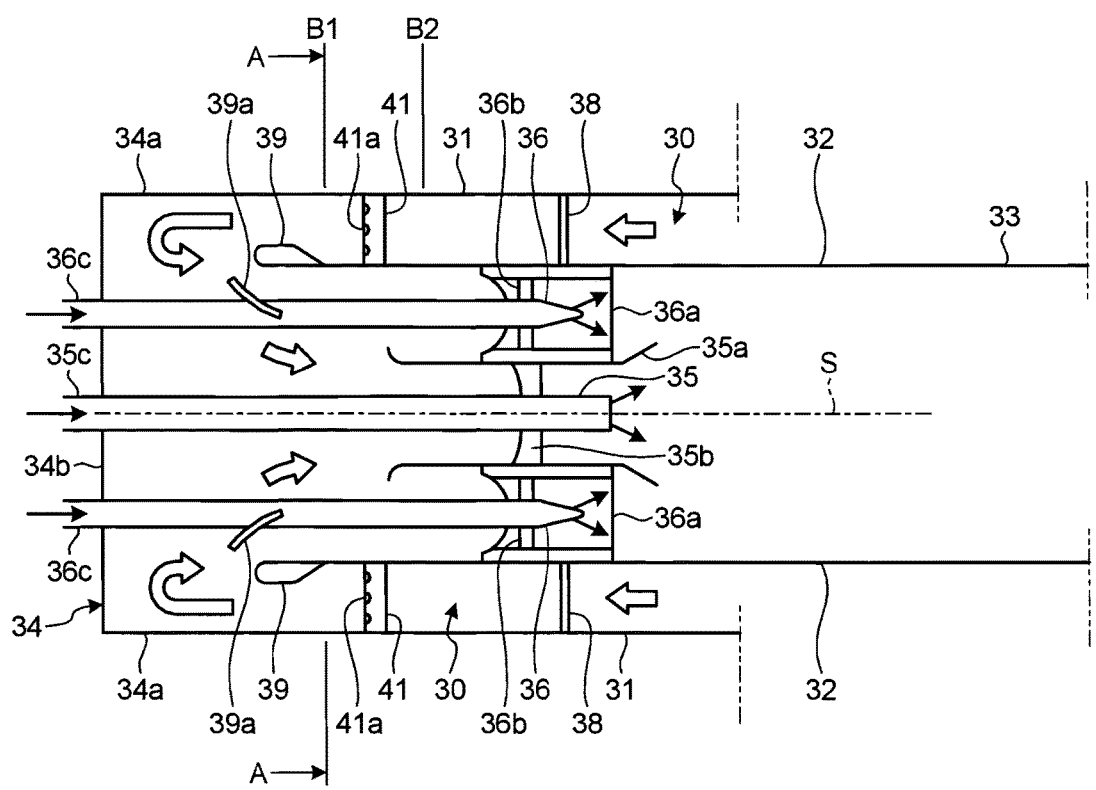
FIG. 2 is a cross-sectional view of a gas turbine combustor according to a first embodiment of the present invention.
Figure 3:
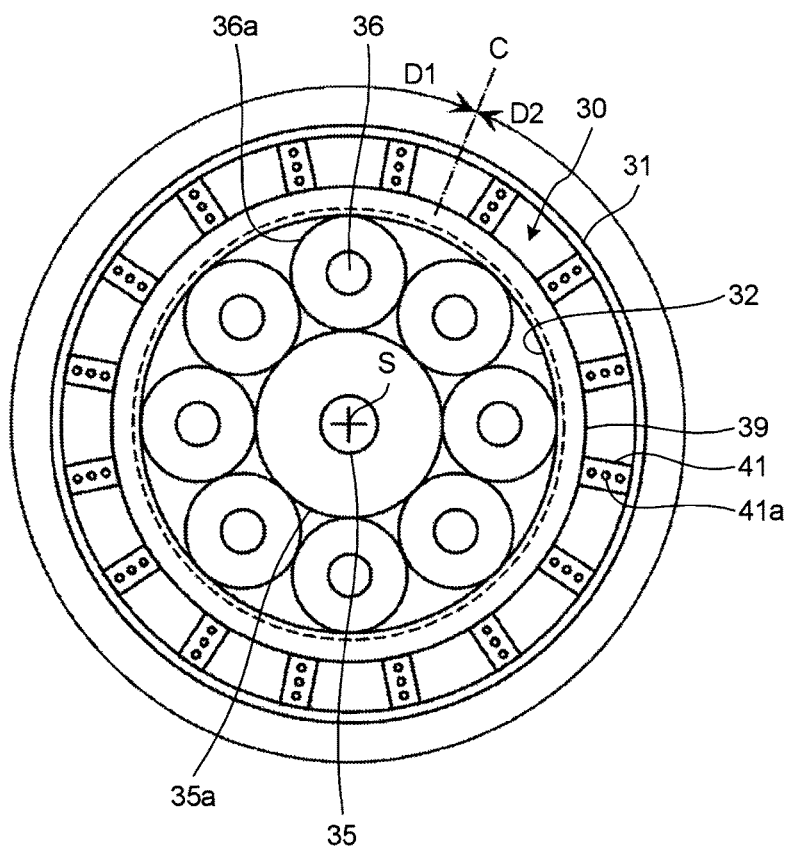
FIG. 3 is an arrow view taken along line A-A in FIG. 2.

FIG. 2 is a cross-sectional view of the gas turbine combustor according to a first embodiment, whereas FIG. 3 is an arrow view taken along line A-A in FIG. 2. As illustrated in FIGS. 2 and 3, an inner cylinder 32 is supported in the aforementioned combustor 12 such that an air passage 30 is formed inside an external cylinder 31 at a predetermined interval therefrom, and an end of the inner cylinder 32 is connected to a transition piece 33 to constitute a combustor casing.

A pilot nozzle 35 is disposed along a combustor axis S, which is at a center of the inner cylinder 32, into a direction to which the combustor axis S extends. A cylindrical combustion chamber 35a is mounted around the tip of the pilot nozzle 35, the end side of the combustion chamber 35a being formed at a wide angle. Moreover, a pilot swirler 35b is provided between an outer peripheral surface of the pilot nozzle 35 and an inner peripheral surface of the combustion chamber 35a.

A plurality of (eight units in the present embodiment) main nozzles (also referred to as a premixing nozzle) 36 is disposed parallel to the combustor axis S on the inner peripheral surface of the inner cylinder 32 along a circumferential direction thereof so as to surround the pilot nozzle 35. A cylindrical extension cylinder 36a is mounted around the tip of the main nozzle 36. A main swirler 36b is provided between an outer peripheral surface of the main nozzle 36 and an inner peripheral surface of the extension cylinder 36a.

A top hat part 34 is provided at a base end portion of the external cylinder 31. The top hat part 34 is disposed along an inner peripheral surface of a base end portion of the external cylinder 31 and includes a cylindrical member 34a that forms a part of the air passage 30 together with the external cylinder 31, and a lid member 34b that closes an opening of the cylindrical member 34a at the base end thereof. The lid member 34b supports the pilot nozzle 35, a fuel port 35c of which is disposed outside the lid member 34b. The fuel port 35c is connected to a pilot nozzle fuel line (not shown) to supply fuel to the pilot nozzle 35. The lid member 34b also supports the main nozzle 36, a fuel port 36c of which is disposed outside the lid member 34b. The fuel port 36c is connected to a main nozzle fuel line (not shown) to supply fuel to the main nozzle 36.

A top hat nozzle 41 is provided inside the air passage 30 in the cylindrical member 34a of the top hat part 34. Although not shown, fuel is supplied to the top hat nozzle 41 from a top hat nozzle fuel line connected to a fuel port that is provided outside the top hat part 34. The top hat nozzle 41 will be described in more detail later.

A partition (not shown) is provided in the cylindrical member 34a of the top hat part 34 on the base end side of the external cylinder 31 to allow the air passage 30 to be communicated with the inner cylinder 32. A distribution plate 38 is provided at an inlet portion of the air passage 30 between the external cylinder 31 (the cylindrical member 34a of the top hat part 34) and the inner cylinder 32. The distribution plate 38 is a porous plate on which a number of holes are formed to communicate the upstream side with the downstream side of the air passage 30 and is provided to cover the air passage 30. In addition, a turning part 39 is provided at a base end portion of the inner cylinder 32 forming the air passage 30. The turning part 39 substantially reverses a flow passage direction of the air passage 30 in cooperation with the partition. An inner surface of the turning part 39 facing the side of the external cylinder 31 to form a part of the air passage 30 is thickened toward the side of the external cylinder 31. A turning vane 39a is also provided in the inner cylinder 32 on the inner side of the turning part 39. The turning vane 39a extends from outside the main nozzle 36 in the radial direction thereof toward the combustor axis S and forms an arc toward the tip side of the main nozzle 36 in the vicinity of the main nozzle 36.

In the gas turbine combustor 12, the high-temperature, high-pressure compressed air flows into the air passage 30 and is rectified by passing through the distribution plate 38. The flow of the compressed air is then narrowed by the turning part 39, homogenized in the circumferential direction of the combustor 12, further rectified by the turning vane 39a to be guided to the combustion chamber 35a of the pilot nozzle 35 and the extension cylinder 36a of the main nozzle 36, and becomes a swirling air current by the pilot swirler 35b and the main swirler 36b. The compressed air is mixed with the fuel ejected from the top hat nozzle 41 in the air passage 30 to be a fuel mixture and flows into the inner cylinder 32. In the inner cylinder 32, the fuel ejected from the main nozzle 36 is mixed with the fuel mixture by the extension cylinder 36a to be a swirl flow of the premixed air by the main swirler 36b and flow into the transition piece 33. The fuel mixture is mixed with the fuel ejected from the pilot nozzle 35, lit by a pilot light (not shown) and combusted to be the combustion gas, and ejected into the transition piece 33. At this time, a portion of the combustion gas is ejected into the transition piece 33 with flame to be diffused to the surrounding, so that the premixed air having flowed into the transition piece 33 from each main nozzle 36 is lit and combusted. That is, the diffusion flame by the pilot fuel ejected from the pilot nozzle 35 allows for the flame stabilizing in order to perform stable combustion of the diluted premixed fuel from the main nozzle 36. The low NOx emission can also be achieved by homogenizing the fuel concentration by premixing the fuel in the main nozzle 36. Moreover, the fuel and the combustion air in the mixed air can be mixed more uniformly by first forming the mixed air with a low concentration in the air passage 30 by mixing the compressed air with the fuel to be the fuel mixture by the top hat nozzle 41, and thereafter producing the mixed air with a high concentration by the downstream main nozzle 36, the mixed air being ejected into the inner cylinder 32. As a result, there would not be the high temperature portion in the combustion gas due to disparity in an air-fuel ratio, thereby further achieving the low NOx emission.

The top hat nozzle 41 according to the present embodiment will now be described. As illustrated in FIGS. 2 and 3, the plurality of top hat nozzles 41 (16 units in FIG. 3) is provided in the circumferential direction within the air passage 30. The top hat nozzle 41 forms a columnar shape (such as a circular cylinder) centered around the combustor axis S and extending in the radial direction. Also formed in the top hat nozzle 41 is a passage (not shown) through which the fuel is supplied to the inside of the columnar top hat nozzle, and a fuel ejection port 41a communicated with the passage to eject the fuel outside the columnar top hat nozzle.

Although disposed at equal intervals in the circumferential direction as illustrated in FIG. 3, the top hat nozzles 41 need not be disposed at the equal intervals. That is, some of the top hat nozzles 41 may be disposed together at a position of each main nozzle 36 such that, for example, two of the top hat nozzles 41 are brought close to each other toward each of the eight main nozzles 36 provided as illustrated in FIG. 3. As illustrated in FIGS. 2 and 3, the fuel ejection port 41a is provided in plurality (three ports in FIGS. 2 and 3) into the direction to which the column extends toward the downstream side of the compressed air in the air passage 30. However, the number and the orientation of the fuel ejection port may be different as long as the compressed air flowing through the air passage 30 is appropriately mixed with the fuel.

Figure 4:
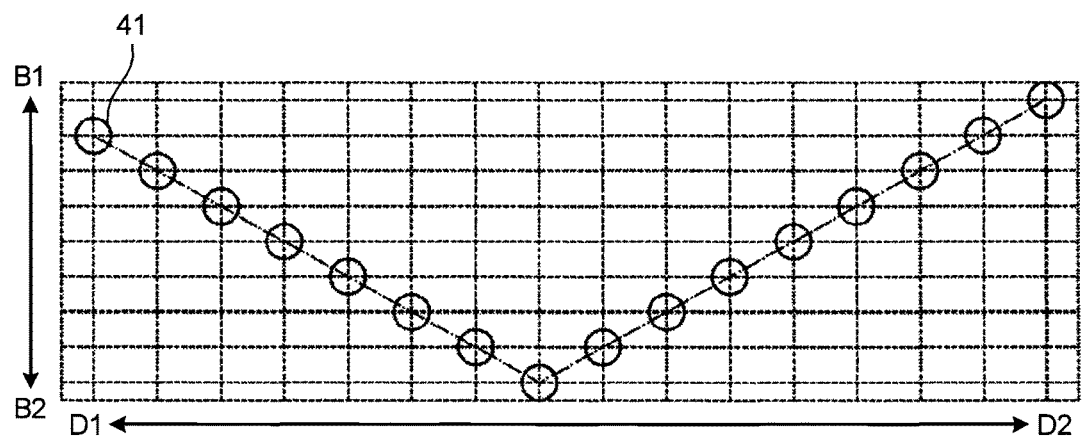
FIG. 4 is a schematic view cut along line C and expanded along D1-D2 in FIG. 3 over the range of B1-B2 in FIG. 2.

The top hat nozzles 41 are disposed such that the position thereof, from which the fuel is ejected, is varied in the direction to which the combustor axis S extends (the combustor axis direction). FIG. 4 is a schematic view cut along line C and expanded along D1-D2 in FIG. 3 over the range of B1-B2 in FIG. 2 to illustrate the arrangement of the top hat nozzle 41.

The top hat nozzles 41 illustrated in FIG. 4 are disposed such that the position thereof along B1-B2 that is the direction to which the combustor axis S extends is varied regularly to be aligned on a straight line along D1-D2 that is the circumferential direction, while having an aspect that the position of the top hat nozzles inclines toward the combustor axis S without becoming orthogonal thereto.

Although not shown, the top hat nozzles 41 may also be disposed such that the position thereof along B1-B2 that is the direction to which the combustor axis S extends is varied regularly to be aligned on a quadratic curve along D1-D2 that is the circumferential direction. The regular variation in the position of the top hat nozzle 41 in the direction to which the combustor axis S extends means that there is regularity in the relationship between the positions of the top hat nozzles 41 arranged in the circumferential direction, the positions being varied in the direction to which the combustor axis S extends. Therefore, the top hat nozzles need not be disposed regularly on the line as illustrated in FIG. 4 as long as there is regularity in the relationship between the positions of the top hat nozzles, the positions being varied in the direction to which the combustor axis S extends.

Although not shown, the top hat nozzles 41 may also be disposed such that the position thereof along B1-B2 that is the direction to which the combustor axis S extends is varied irregularly along D1-D2 that is the circumferential direction.

As described above, the position of the top hat nozzle 41 from which the fuel is ejected in the gas turbine combustor 12 according to the present embodiment is varied in the direction to which the combustor axis S extends (the combustor axis direction).

According to the gas turbine combustor 12, the variation in the position from which the fuel is ejected in the direction to which the combustor axis S extends generates a number of combustion oscillations that would be present with different frequencies, thereby momentarily causing a phase difference in the frequencies of the combustion oscillations. As a result, the mixed state of the premixed air changes momentarily and, at the same time, the combustion state of each main nozzle 36 on the downstream side of the extension cylinder 36a changes momentarily, whereby the heat distribution of the combustor 12 all around in the direction to which the combustor axis S extends changes momentarily. For this reason, the concentrated heating in the combustor 12 can be suppressed so that the combustion oscillation can be suppressed. At the same time, the fuel concentration would be homogenized since the mixed state of the premixed air is equal in a predetermined time unit. The combustion oscillation of a wide range of frequencies can thus be suppressed while maintaining the low NOx emission.

Moreover, the top hat nozzle 41 in the gas turbine combustor 12 according to the present embodiment is provided in plurality in the circumferential direction and disposed such that the position of the top hat nozzle is varied regularly in the direction to which the combustor axis S extends (the combustor axis direction).

According to the gas turbine combustor 12, in addition to the aforementioned effect that the combustion oscillation of a wide range of frequencies can be suppressed while maintaining the low NOx emission by the top hat nozzle 41, a manufacturing cost of the gas turbine combustor 12 can be reduced since the gas turbine combustor is easily manufactured owing to the regular arrangement thereof. Moreover, there is no need for a new configuration to be provided to suppress the combustion oscillation because the configuration of the top hat nozzle 41 itself suppresses the generation of combustion oscillation, the top hat nozzle achieving the low NOx emission. Therefore, there would not be a problem such as increase in the manufacturing cost of the gas turbine combustor 12 and increase in weight thereof.

The top hat nozzle 41 in the gas turbine combustor 12 according to the present embodiment is provided in plurality in the circumferential direction and disposed such that the position of the top hat nozzle is varied irregularly in the direction to which the combustor axis S extends (the combustor axis direction).

According to the gas turbine combustor 12, in addition to the aforementioned effect that the combustion oscillation of a wide range of frequencies can be suppressed while maintaining the low NOx emission by the top hat nozzle 41, the suppression of the combustion oscillation of a wide range of frequencies can be prominently obtained as an effect because a greater number of the combustion oscillations with different frequencies would be present causing subtler phase differences in the frequencies of the combustion oscillations to occur, whereby the combustion oscillation of a wider range of frequencies including the specific combustion oscillation can be suppressed. Moreover, there is no need for a new configuration to be provided to suppress the combustion oscillation because the configuration of the top hat nozzle 41 itself suppresses the generation of combustion oscillation, the top hat nozzle achieving the low NOx emission. Therefore, there would not be a problem such as increase in the manufacturing cost of the gas turbine combustor 12 and increase in weight thereof.

In the first embodiment, a top hat nozzle group may be disposed in plurality in the direction to which the combustor axis S extends (the combustor axis direction), the top hat nozzle group including a configuration in which the plurality of top hat nozzles is disposed in the circumferential direction at positions varied in the combustor axis direction. In this case, the plurality of top hat nozzle groups having the same configuration or different configurations among each configuration described in the first embodiment may be disposed in the direction to which the combustor axis S extends.

According to the gas turbine combustor 12, the combustion oscillation in a wide range of frequencies can be suppressed while maintaining the low NOx emission by the top hat nozzle group formed of the plurality of top hat nozzles 41 provided in the circumferential direction and disposed at different positions in the combustor axis direction. The top hat nozzle group being disposed in plurality in the combustor axis direction, the suppression of the combustion oscillation in a wide range of frequencies can be multiplied as an effect and obtained prominently.

When the top hat nozzle 41 in the top hat nozzle group is provided in plurality in the circumferential direction and disposed at the position that varies regularly in the direction to which the combustor axis S extends (the combustor axis direction), the manufacturing cost of the gas turbine combustor 12 can be reduced since the gas turbine combustor is easily manufactured owing to the regular arrangement thereof.

When the top hat nozzle 41 in the top hat nozzle group is provided in plurality in the circumferential direction and disposed at the position that varies irregularly in the direction to which the combustor axis S extends (the combustor axis direction), the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed.

[Second Embodiment]

Figure 5:
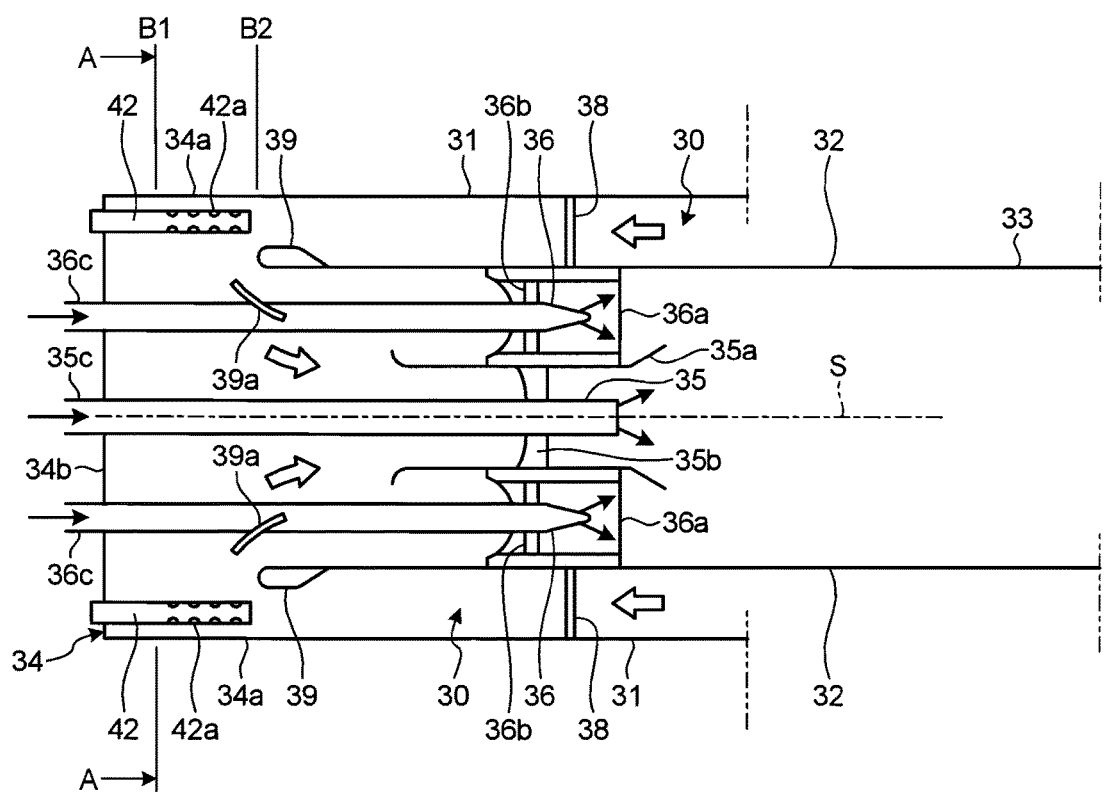
FIG. 5 is a cross-sectional view of a gas turbine combustor according to a second embodiment of the present invention.
Figure 6:
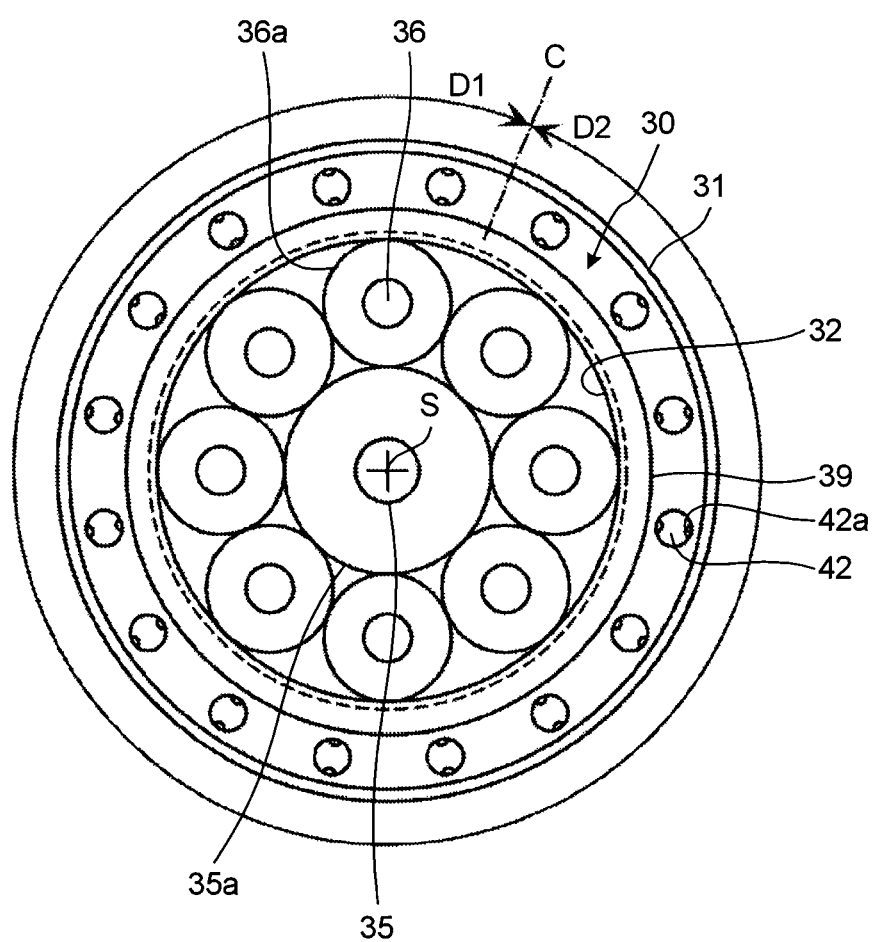
FIG. 6 is an enlarged view of a cross section along line A-A in FIG. 5.

FIG. 5 is a cross-sectional view of a gas turbine combustor according to a second embodiment, and FIG. 6 is an enlarged view of a cross section along line A-A in FIG. 5.

A gas turbine combustor 12 according to the present embodiment employs a top hat nozzle 42 different from the top hat nozzle 41 of the gas turbine combustor 12 according to the first embodiment. The top hat nozzle 42 will thus be described in the present embodiment while omitting the description of a part identical to that of the first embodiment by assigning the identical reference numeral to the part.

As illustrated in FIG. 5, the top hat nozzle 42 is provided inside an air passage 30. Although not shown, fuel is supplied to the top hat nozzle 42 from a top hat nozzle fuel line connected to a fuel port that is provided outside a top hat part 34.

As illustrated in FIGS. 5 and 6, the plurality of top hat nozzles 42 (16 units in FIG. 6) is provided in the circumferential direction within the air passage 30. The top hat nozzle 42 forms a columnar shape (such as a circular cylinder) extending along a combustor axis S. Also formed in the top hat nozzle 42 is a passage (not shown) through which the fuel is supplied to the inside of the columnar top hat nozzle, and a fuel ejection port 42a provided midway in the extending direction of the top hat nozzle and communicated with the passage to eject the fuel outside the columnar top hat nozzle.

Although disposed at equal intervals in the circumferential direction as illustrated in FIG. 6, the top hat nozzles 42 need not be disposed at the equal intervals. That is, some of the top hat nozzles 42 may be disposed together at a position of each main nozzle 36 such that, for example, two of the top hat nozzles 42 are brought close to each other toward each of the eight main nozzles 36 provided as illustrated in FIG. 6. As illustrated in FIG. 5, the fuel ejection port 42a is provided in plurality (four ports in FIG. 5) into the direction to which the columnar top hat nozzle extends while facing an external cylinder 31 side and an inner cylinder 32 side in the air passage 30. However, the number and the orientation of the fuel ejection port may be different as long as the compressed air flowing through the air passage 30 is appropriately mixed with the fuel.

Figure 7:
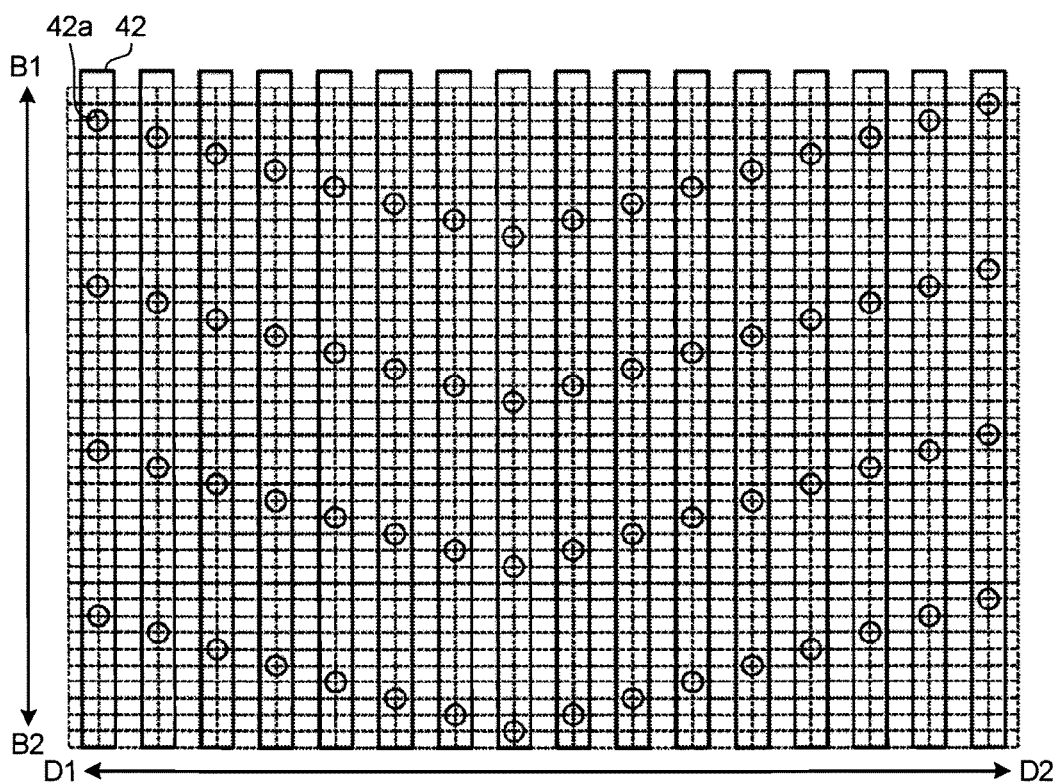
FIG. 7 is a schematic view cut along line C and expanded along D1-D2 in FIG. 6 over the range of B1-B2 in FIG. 5.
Figure 8:
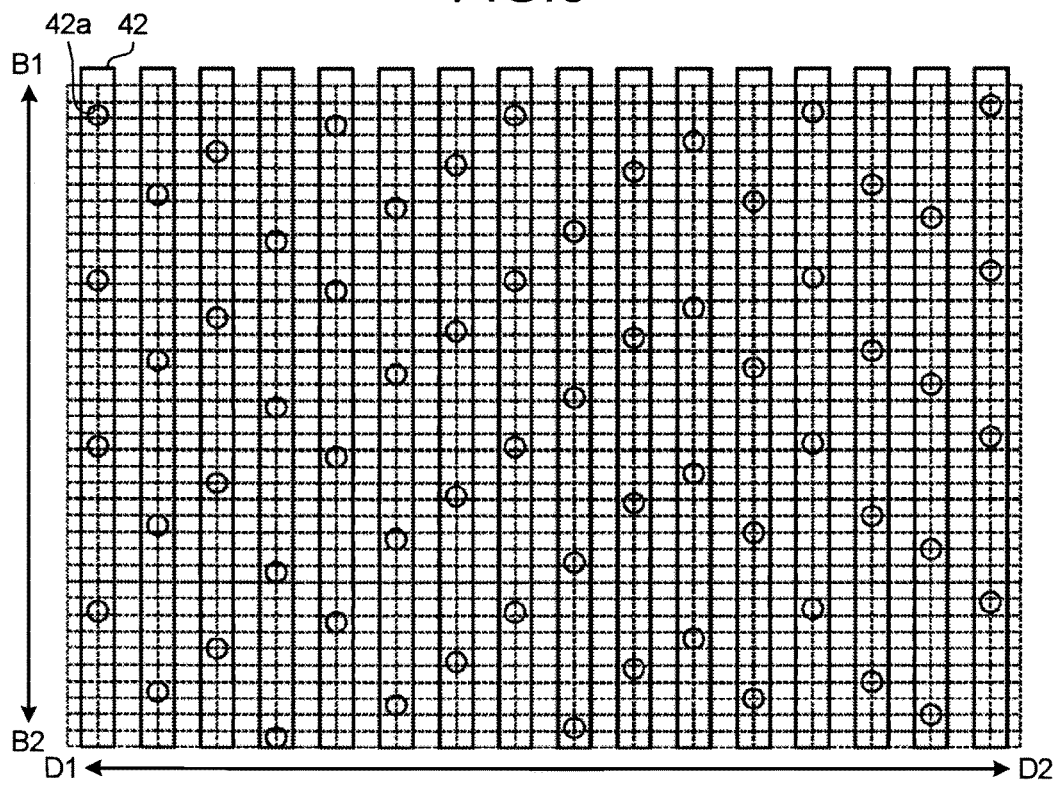
FIG. 8 is a schematic view cut along line C and expanded along D1-D2 in FIG. 6 of another example over the range of B1-B2 in FIG. 5.

The top hat nozzles 42 are disposed such that the position thereof, from which the fuel is ejected, is varied in the direction to which the combustor axis S extends (the combustor axis direction). FIGS. 7 and 8 are schematic views cut along line C and expanded along D1-D2 in FIG. 6 over the range of B1-B2 in FIG. 5 to illustrate the arrangement of the fuel ejection port 42a of the top hat nozzle 42.

As illustrated in FIG. 7, the top hat nozzles 42 are disposed such that the positions thereof in B1-B2 that is the direction to which the combustor axis S extends are the same across D1-D2 that is the circumferential direction. The top hat nozzles 42 are disposed such that the position of the fuel ejection port 42a along B1-B2 that is the direction to which the combustor axis S extends is varied regularly to be aligned on a straight line along D1-D2 that is the circumferential direction, the position of the fuel ejection port inclining toward the combustor axis S without becoming orthogonal thereto. Although not shown, the top hat nozzles 42 may also be disposed such that the position of the fuel ejection port 42a along B1-B2 that is the direction to which the combustor axis S extends is varied regularly to be aligned on a quadratic curve along D1-D2 that is the circumferential direction. Here, the regular variation in the position of the fuel ejection port 42a in the direction to which the combustor axis S extends means that there is regularity in the relationship between the positions of the fuel ejection ports 42a of the top hat nozzles 42 arranged in the circumferential direction, the positions being varied in the direction to which the combustor axis S extends. Therefore, the fuel ejection ports need not be disposed regularly on the line as illustrated in FIG. 7 as long as there is regularity in the relationship between the positions of the fuel ejection ports, the positions being varied in the direction to which the combustor axis S extends.

As illustrated in FIG. 7, the respective (four) fuel ejection ports 42a in each top hat nozzle 42 arranged along D1-D2 that is the circumferential direction are disposed such that the position of the fuel ejection port 42a along B1-B2 that is the direction to which the combustor axis S extends is varied regularly to be aligned on the straight line along D1-D2 that is the circumferential direction, the position of the fuel ejection port inclining toward the direction to which the combustor axis S extends without becoming orthogonal thereto. However, the fuel ejection ports may also be disposed in a different manner in which, for example, the fuel ejection ports 42a having different arrangements are provided in a mixed manner, the arrangements including: the arrangement in the aforementioned manner; the arrangement in which the position of the fuel ejection port 42a along B1-B2 that is the direction to which the combustor axis S extends is varied regularly to be aligned on a quadratic curve along D1-D2 that is the circumferential direction; and the arrangement in which the position of the fuel ejection port 42a is varied regularly in another manner.

The top hat nozzles 42 illustrated in FIG. 8 are disposed such that the positions thereof in B1-B2 that is the direction to which the combustor axis S extends are the same across D1-D2 that is the circumferential direction. The top hat nozzles 42 are disposed such that the position of the fuel ejection port 42a along B1-B2 that is the direction to which the combustor axis S extends is varied irregularly along D1-D2 that is the circumferential direction.

As illustrated in FIG. 8, the respective (four) fuel ejection ports 42a in each top hat nozzle 42 arranged along D1-D2 that is the circumferential direction are disposed such that the position of the fuel ejection port 42a along B1-B2 that is the direction to which the combustor axis S extends is varied irregularly along D1-D2 that is the circumferential direction in each top hat nozzle 42. However, the fuel ejection ports 42a are disposed at equal intervals in the direction to which the combustor axis S extends. Although not shown, the fuel ejection ports 42a may also be disposed irregularly in the direction to which the combustor axis S extends.

Although not shown, the respective (four) fuel ejection ports 42a in each top hat nozzle 42 arranged along D1-D2 that is the circumferential direction may be disposed such that different arrangements are provided in a mixed manner, the arrangements including one in which the position of the fuel ejection port 42a along B1-B2 that is the direction to which the combustor axis S extends is varied regularly along D1-D2 that is the circumferential direction, and one in which the position of the fuel ejection ports 42a along B1-B2 that is the direction to which the combustor axis S extends is varied irregularly along D1-D2 that is the circumferential direction.

As described above, the position of the top hat nozzle 42 from which the fuel is ejected in the gas turbine combustor 12 according to the present embodiment is varied in the direction to which the combustor axis S extends (the combustor axis direction).

According to the gas turbine combustor 12, the variation in the position from which the fuel is ejected in the direction to which the combustor axis S extends generates a number of combustion oscillations that would be present with different frequencies, thereby momentarily causing a phase difference in the frequencies of the combustion oscillations. As a result, the mixed state of the premixed air changes momentarily and, at the same time, the combustion state of each main nozzle 36 on the downstream side of an extension cylinder 36a changes momentarily, whereby the heat distribution of the combustor 12 all around in the direction to which the combustor axis S extends changes momentarily. For this reason, the concentrated heating in the combustor 12 can be suppressed so that the combustion oscillation can be suppressed. At the same time, the fuel concentration would be homogenized since the mixed state of the premixed air is equal in a predetermined time unit. The combustion oscillation of a wide range of frequencies can thus be suppressed while maintaining the low NOx emission.

In the gas turbine combustor 12 according to the present embodiment, the top hat nozzle 42 is provided in plurality in the circumferential direction, includes the fuel ejection port 42a for ejecting the fuel provided midway in the direction to which the combustor axis S extends (the combustor axis direction), and is disposed such that the position of the fuel ejection port 42a is varied regularly in the combustor axis direction.

According to the gas turbine combustor 12, in addition to the aforementioned effect that the combustion oscillation of a wide range of frequencies can be suppressed while maintaining the low NOx emission by the top hat nozzle 42, the manufacturing cost of the gas turbine combustor 12 can be reduced since the gas turbine combustor is easily manufactured owing to the regular arrangement thereof. Moreover, there is no need for a new configuration to be provided to suppress the combustion oscillation because the configuration of the top hat nozzle 42 itself suppresses the generation of combustion oscillation, the top hat nozzle achieving the low NOx emission. Therefore, there would not be a problem such as increase in the manufacturing cost of the gas turbine combustor 12 and increase in weight thereof. According to the gas turbine combustor 12 of the present embodiment, since the top hat nozzle 42 extends in the direction to which the combustor axis S extends, the position of the fuel ejection port 42a in the combustor axis direction can be varied by changing the arrangement of the top hat nozzle in the extending direction thereof, thereby allowing a component to be shared and standardized to prevent the increase in the manufacturing cost of the gas turbine combustor 12.

Moreover, in the gas turbine combustor 12 according to the present embodiment, the top hat nozzle 42 is provided in plurality in the circumferential direction, includes the fuel ejection port 42a for ejecting the fuel provided midway in the direction to which the combustor axis S extends (the combustor axis direction), and is disposed such that the position of the fuel ejection port 42a is varied irregularly in the combustor axis direction.

According to the gas turbine combustor 12, in addition to the aforementioned effect that the combustion oscillation of a wide range of frequencies can be suppressed while maintaining the low NOx emission by the top hat nozzle 42, the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed. Moreover, there is no need for a new configuration to be provided to suppress the combustion oscillation because the configuration of the top hat nozzle 42 itself suppresses the generation of combustion oscillation, the top hat nozzle achieving the low NOx. Therefore, there would not be a problem such as increase in the manufacturing cost of the gas turbine combustor 12 and increase in weight thereof.

In the gas turbine combustor 12 according to the present embodiment, the fuel ejection port 42a is disposed in plurality in the direction to which the combustor axis S extends (the combustor axis direction).

According to the gas turbine combustor 12, the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed.

[Third Embodiment]

Figure 9:
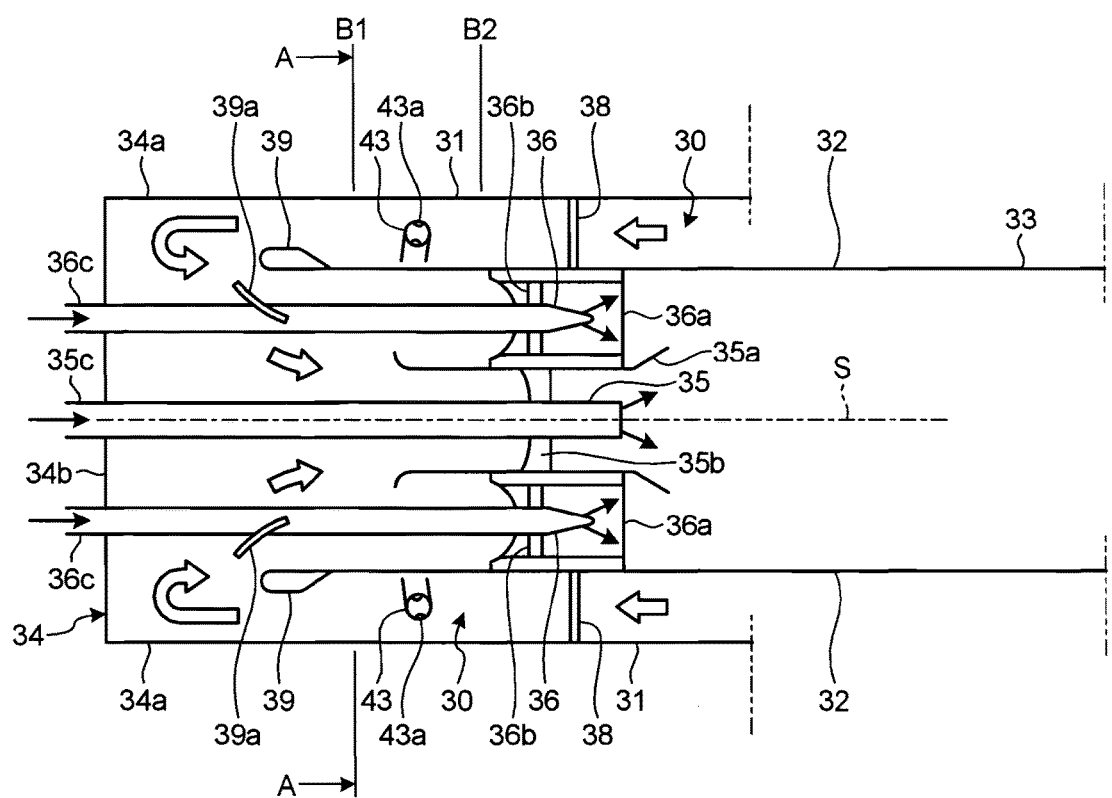
FIG. 9 is a cross-sectional view of a gas turbine combustor according to a third embodiment of the present invention.
Figure 10:
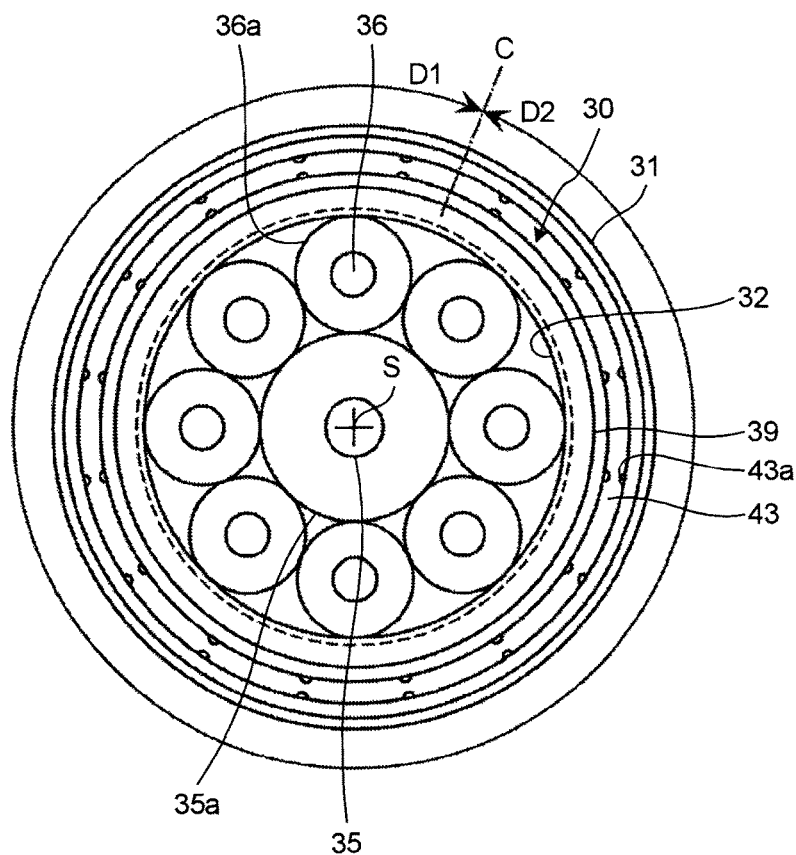
FIG. 10 is an enlarged view of a cross section along line A-A in FIG. 9.

FIG. 9 is a cross-sectional view of a gas turbine combustor according to a third embodiment, and FIG. 10 is an enlarged view of a cross section along line A-A in FIG. 9.

A gas turbine combustor 12 according to the present embodiment employs a top hat nozzle 43 different from the top hat nozzle 41 of the gas turbine combustor 12 according to the first embodiment. The top hat nozzle 43 will thus be described in the present embodiment while omitting the description of a part identical to that of the first embodiment by assigning the identical reference numeral to the part.

As illustrated in FIG. 9, the top hat nozzle 43 is provided inside an air passage 30. Although not shown, fuel is supplied to the top hat nozzle 43 from a top hat nozzle fuel line connected to a fuel port that is provided outside a top hat part 34.

As illustrated in FIGS. 9 and 10, the top hat nozzle 43 is formed into an annular shape along the circumferential direction within the air passage 30. Also annularly formed in the top hat nozzle 43 is a passage (not shown) through which the fuel is supplied to the inside of the annular top hat nozzle, and a fuel ejection port 43a communicated with the passage to eject the fuel outside the annular top hat nozzle.

As illustrated in FIGS. 9 and 10, the fuel ejection port 43a is provided in plurality (16 ports in FIG. 10) in the circumferential direction while facing an external cylinder 31 side and an inner cylinder 32 in the air passage 30. However, the number and the orientation of the fuel ejection port may be different as long as the compressed air flowing through the air passage 30 is appropriately mixed with the fuel. Although disposed at equal intervals in the circumferential direction as illustrated in FIG. 10, the fuel ejection ports 43a need not be disposed at the equal intervals. That is, some of the fuel ejection ports 43a may be disposed together at a position of each main nozzle 36 such that, for example, two of the fuel ejection ports 43*a* are brought close to each other toward each of the eight main nozzles 36 provided as illustrated in FIG. 10.

Figure 11:
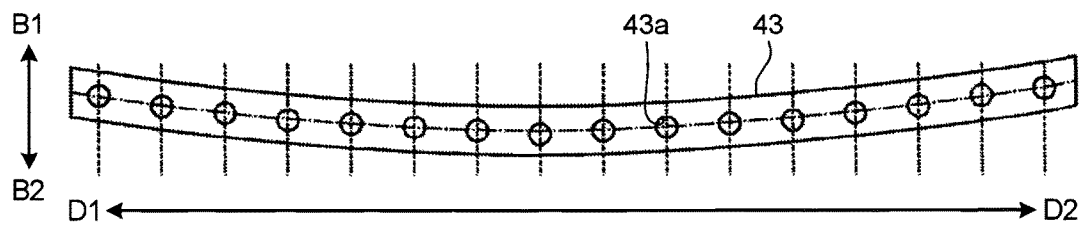
FIG. 11 is a schematic view cut along line C and expanded along D1-D2 in FIG. 10 over the range of B1-B2 in FIG. 9.

The top hat nozzles 43 are disposed such that the position thereof, from which the fuel is ejected, is varied in the direction to which the combustor axis S extends (the combustor axis direction). FIG. 11 is a schematic view cut along line C and expanded along D1-D2 in FIG. 10 over the range of B1-B2 in FIG. 9.

As illustrated in FIG. 11, a central axis of the annular top hat nozzle 43 is provided at an angle with respect to the combustor axis S. As a result, the position of the fuel ejection port 43*a* along B1-B2 that is the direction to which the combustor axis S extends is varied regularly to be aligned on a quadratic curve along D1-D2 that is the circumferential direction.

Although not shown, the annular top hat nozzle 43 may also be disposed such that the central axis thereof corresponds with the combustor axis S and that the position of the plurality of fuel ejection ports 43*a* along B1-B2 that is the direction to which the combustor axis S extends is varied irregularly along D1-D2 that is the circumferential direction.

As described above, the position of the top hat nozzle 43 from which the fuel is ejected in the gas turbine combustor 12 according to the present embodiment is varied in the direction to which the combustor axis S extends (the combustor axis direction).

According to the gas turbine combustor 12, the variation in the position from which the fuel is ejected in the direction to which the combustor axis S extends generates a number of combustion oscillations that would be present with different frequencies, thereby momentarily causing a phase difference in the frequencies of the combustion oscillations. As a result, the mixed state of the premixed air changes momentarily and, at the same time, the combustion state of each main nozzle 36 on the downstream side of an extension cylinder 36*a* changes momentarily, whereby the heat distribution of the combustor 12 all around in the direction to which the combustor axis S extends changes momentarily. For this reason, the concentrated heating in the combustor 12 can be suppressed so that the combustion oscillation can be suppressed. At the same time, the fuel concentration would be homogenized since the mixed state of the premixed air is equal in a predetermined time unit. The combustion oscillation of a wide range of frequencies can thus be suppressed while maintaining the low NOx emission.

In the gas turbine combustor 12 according to the present embodiment, the top hat nozzle 43 is formed annularly along the circumferential direction, provided with the plurality of fuel ejection ports 43*a* in the circumferential direction for ejecting the fuel, and disposed such that the position of the fuel ejection port 43*a* is varied regularly in the direction to which the combustor axis S extends (the combustor axis direction).

According to the gas turbine combustor 12, in addition to the aforementioned effect that the combustion oscillation of a wide range of frequencies can be suppressed while maintaining the low NOx emission by the top hat nozzle 43, the manufacturing cost of the gas turbine combustor 12 can be reduced since the gas turbine combustor is easily manufactured owing to the regular arrangement thereof. Moreover, the designing freedom in the arrangement of the fuel ejection port 43*a* in the circumferential direction would increase since the top hat nozzle 43 is formed annularly. Moreover, there is no need for a new configuration to be provided to suppress the combustion oscillation because the configuration of the top hat nozzle 43 itself suppresses the generation of combustion oscillation, the top hat nozzle achieving the low NOx. Therefore, there would not be a problem such as increase in the manufacturing cost of the gas turbine combustor 12 and increase in weight thereof.

In the third embodiment, the top hat nozzle 43 formed annularly along the circumferential direction may be disposed in plurality in the direction to which the combustor axis S extends (the combustor axis direction). In this case, a plurality of top hat nozzle groups having the same configuration or different configurations among each configuration described in the third embodiment may be disposed in the direction to which the combustor axis S extends.

According to the gas turbine combustor 12, the suppression of the combustion oscillation of a wide range of frequencies can be prominently obtained as an effect because a greater number of the combustion oscillations of different frequencies would be present causing subtler phase differences in the frequencies of the combustion oscillations, whereby the combustion oscillation of a wider range of frequencies including the specific combustion oscillation can be suppressed.

Moreover, the annular top hat nozzle 43 may also be disposed such that: the central axis thereof corresponds with the combustor axis S; the top hat nozzle 43 is provided in plurality in the direction to which the combustor axis S extends; and the position of the fuel ejection ports 43*a* in the circumferential direction is mutually differed by mutually varying the position of the fuel ejection ports 43*a* in the combustor axis direction.

According to the gas turbine combustor 12, in addition to the aforementioned effect that the combustion oscillation of a wide range of frequencies can be suppressed while maintaining the low NOx emission by the top hat nozzle 43, the manufacturing cost of the gas turbine combustor 12 can be reduced since the gas turbine combustor is easily manufactured owing to the regular arrangement thereof. Moreover, the designing freedom in the arrangement of the fuel ejection port 43*a* in the circumferential direction would increase since the top hat nozzle 43 is formed annularly.

[Fourth Embodiment]

Figure 12:
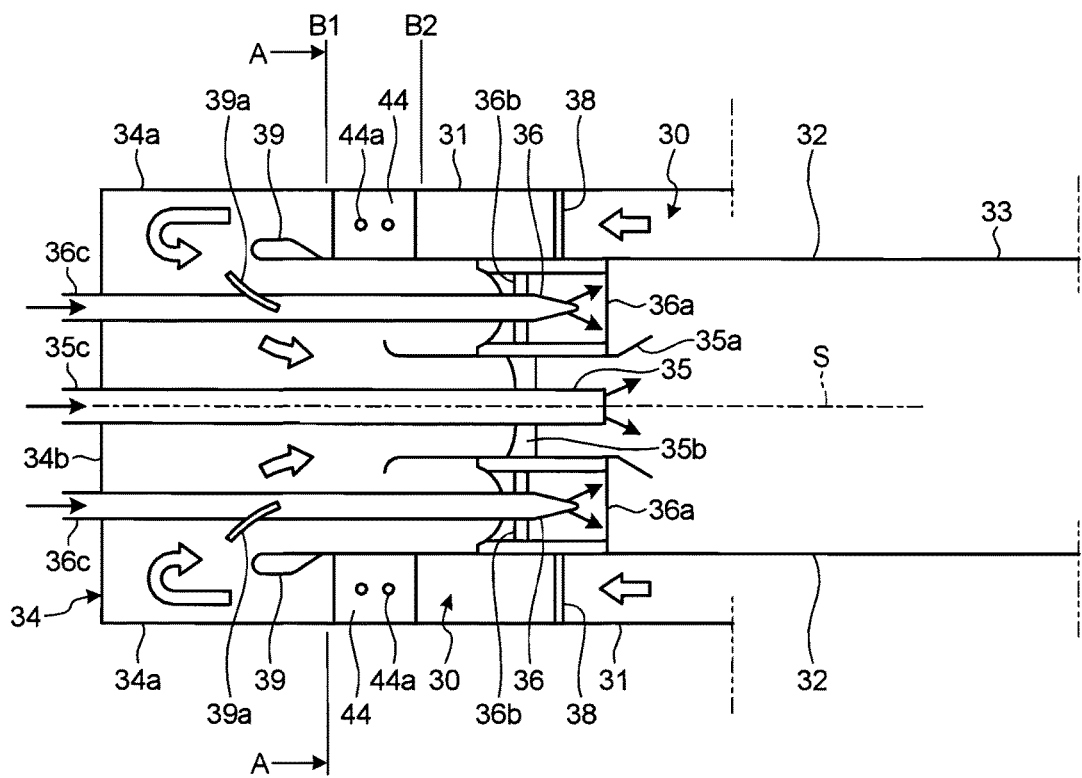
FIG. 12 is a cross-sectional view of a gas turbine combustor according to a fourth embodiment of the present invention.
Figure 13:
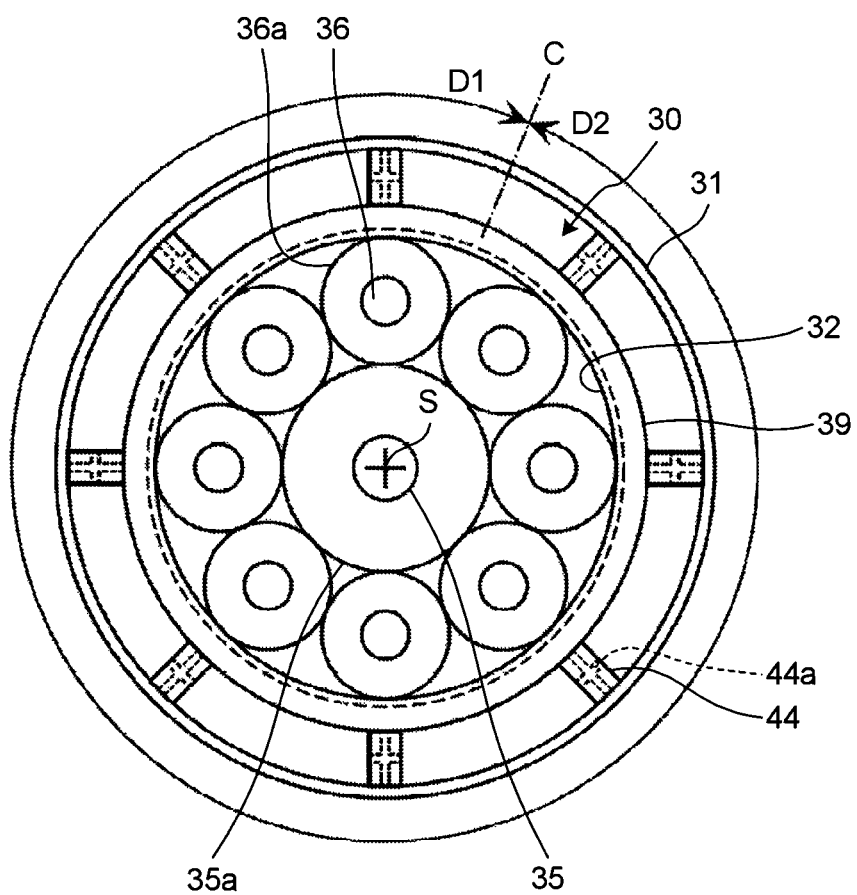
FIG. 13 is an enlarged view of a cross section along line A-A in FIG. 12.
Figure 14:
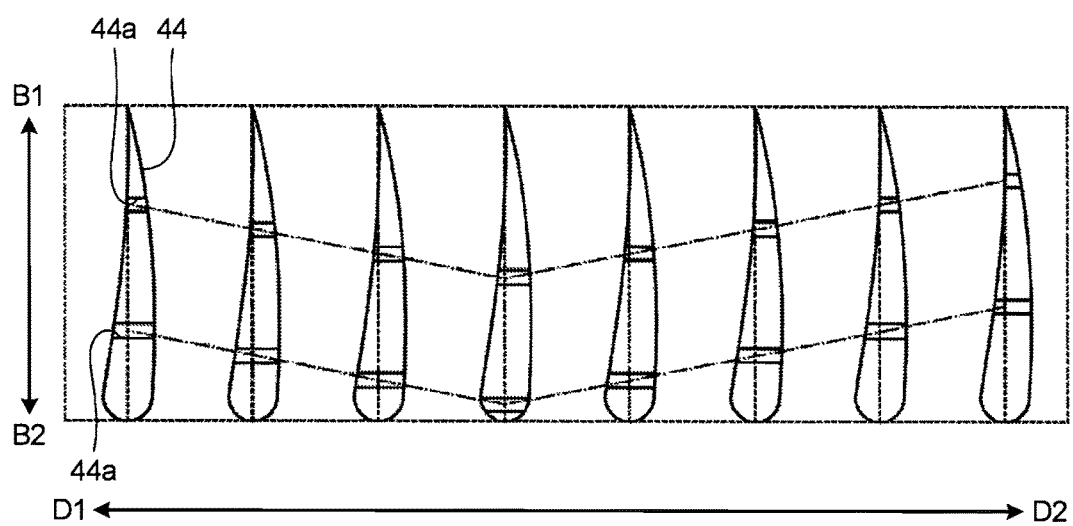
FIG. 14 is a schematic view cut along line C and expanded along D1-D2 in FIG. 13 over the range of B1-B2 in FIG. 12.

FIG. 12 is a cross-sectional view of a gas turbine combustor according to a fourth embodiment, FIG. 13 is an enlarged view of a cross section along line A-A in FIG. 12, and FIG. 14 is a schematic view cut along line C and expanded along D1-D2 in FIG. 13 over the range of B1-B2 in FIG. 12.

A gas turbine combustor 12 according to the present embodiment employs a top hat nozzle 44 different from the top hat nozzle 41 of the gas turbine combustor 12 according to the first embodiment. The top hat nozzle 44 will thus be described in the present embodiment while omitting the description of a part identical to that of the first embodiment by assigning the identical reference numeral to the part.

As illustrated in FIG. 12, the top hat nozzle 44 is provided inside an air passage 30. Although not shown, fuel is supplied to the top hat nozzle 44 from a top hat nozzle fuel line connected to a fuel port that is provided outside a top hat part 34.

As illustrated in FIGS. 12 to 14, the top hat nozzle 44 is provided in plurality (eight units in FIG. 13) in the circumferential direction within the air passage 30. The top hat nozzle 44 has a vane form to rectify the compressed air introduced into the air passage 30. Also formed in the top hat nozzle 44 is a passage (not shown) through which the fuel is supplied to the inside of the vane shaped top hat nozzle, and a fuel ejection port 44*a* provided midway in the direction to which the combustor axis S extends and communicated with the passage to eject the fuel outside the vane shaped top hat nozzle.

As illustrated in FIG. 13, the top hat nozzles 44 are disposed at equal intervals in the circumferential direction. As illustrated in FIG. 13, the fuel ejection port 44a is provided in plurality (two ports in FIG. 12) in the direction to which the combustor axis S extends while being oriented toward both sides of the top hat nozzle in the circumferential direction in the air passage 30. However, the number and the orientation of the fuel ejection port may be different as long as the compressed air flowing through the air passage 30 is appropriately mixed with the fuel.

The top hat nozzles 44 are disposed such that the position thereof, from which the fuel is ejected, is varied in the direction to which the combustor axis S extends (the combustor axis direction).

The top hat nozzles 44 illustrated in FIG. 14 are disposed such that the positions thereof in B1-B2 that is the direction to which the combustor axis S extends are the same across Dl-D2 that is the circumferential direction. The top hat nozzles 44 are disposed such that the position of the fuel ejection port 44a along B1-B2 that is the direction to which the combustor axis S extends is varied regularly to be aligned on a straight line along Dl-D2 that is the circumferential direction, the position of the fuel ejection port inclining toward the combustor axis S without becoming orthogonal thereto. Although not shown, the top hat nozzles 44 may also be disposed such that the position of the fuel ejection port 44a along B1-B2 that is the direction to which the combustor axis S extends is varied regularly to be aligned on a quadratic curve along Dl-D2 that is the circumferential direction. Here, the regular variation in the position of the fuel ejection port 44a in the direction to which the combustor axis S extends means that there is regularity in the relationship between the positions of the fuel ejection ports 44a of the top hat nozzles 44 arranged in the circumferential direction, the positions being varied in the direction to which the combustor axis S extends. Therefore, the fuel ejection ports need not be disposed regularly on the line as illustrated in FIG. 14 as long as there is regularity in the relationship between the positions of the fuel ejection ports, the positions being varied in the direction to which the combustor axis S extends.

As illustrated in FIG. 14, the respective (two) fuel ejection ports 44a provided in the direction to which the combustor axis S extends in each top hat nozzle 44 arranged along Dl-D2 that is the circumferential direction are disposed such that the position of the fuel ejection port 44a along B1-B2 that is the direction to which the combustor axis S extends is varied regularly to be aligned on the straight line along D1-D2 that is the circumferential direction, the position of the fuel ejection port inclining toward the direction to which the combustor axis S extends without becoming orthogonal thereto. However, the fuel ejection ports may be disposed in a different manner in which, for example, the fuel ejection ports 44a having different arrangements are provided in a mixed manner, the arrangements including: the arrangement in the aforementioned manner; the arrangement in which the position of the fuel ejection port 44a along B1-B2 that is the direction to which the combustor axis S extends is varied regularly to be aligned on a quadratic curve along Dl-D2 that is the circumferential direction; and the arrangement in which the position of the fuel ejection port 44a is varied regularly in another manner.

Although not shown, the top hat nozzles 44 may be disposed such that the positions thereof in B1-B2 that is the direction to which the combustor axis S extends are the same across D1-D2 that is the circumferential direction, and that the position of the fuel ejection port 44a along B1-B2 that is the direction to which the combustor axis S extends is varied irregularly along D1-D2 that is the circumferential direction.

In this case, the respective (two) fuel ejection ports 44a provided in the direction to which the combustor axis S extends in each top hat nozzle 44 arranged along D1-D2 that is the circumferential direction are disposed such that the position of the fuel ejection port 44a along B1-B2 that is the direction to which the combustor axis S extends is varied irregularly along D1-D2 that is the circumferential direction in each top hat nozzle 44. However, the fuel ejection ports 44a are disposed at equal intervals in the direction to which the combustor axis S extends. Although not shown, the fuel ejection ports 44a may also be disposed irregularly in the direction to which the combustor axis S extends.

Although not shown, the respective (two) fuel ejection ports 44a provided in the direction to which the combustor axis S extends in each top hat nozzle 44 arranged along D1-D2 that is the circumferential direction may be disposed such that different arrangements are provided in a mixed manner, the arrangements including one in which the position of the fuel ejection port 44a along B1-B2 that is the direction to which the combustor axis S extends is varied regularly along D1-D2 that is the circumferential direction, and one in which the position of the fuel ejection port 44a along B1-B2 that is the direction to which the combustor axis S extends is varied irregularly along D1-D2 that is the circumferential direction.

As described above, the position of the top hat nozzle 44 from which the fuel is ejected in the gas turbine combustor 12 according to the present embodiment is varied in the direction to which the combustor axis S extends (the combustor axis direction).

According to the gas turbine combustor 12, the variation in the position from which the fuel is ejected in the direction to which the combustor axis S extends generates a number of combustion oscillations that would be present with different frequencies, thereby momentarily causing a phase difference in the frequencies of the combustion oscillations. As a result, the mixed state of the premixed air changes momentarily and, at the same time, the combustion state of each main nozzle 36 on the downstream side of an extension cylinder 36a changes momentarily, whereby the heat distribution of the combustor 12 all around in the direction to which the combustor axis S extends changes momentarily. For this reason, the concentrated heating in the combustor 12 can be suppressed so that the combustion oscillation can be suppressed. At the same time, the fuel concentration would be homogenized since the mixed state of the premixed air is equal in a predetermined time unit. The combustion oscillation of a wide range of frequencies can thus be suppressed while maintaining the low NOx emission.

In the gas turbine combustor 12 according to the present embodiment, the top hat nozzle 44 has the vane form in the aspect of rectifying the compressed air (the combustion air) introduced to the air passage 30, includes the fuel ejection port 44a for ejecting the fuel, is provided in plurality in the circumferential direction, and is disposed such that the position of the fuel ejection port 44a in the direction to which the combustor axis S extends (the combustor axis direction) is varied regularly.

According to the gas turbine combustor 12, in addition to the aforementioned effect that the combustion oscillation of a wide range of frequencies can be suppressed while maintaining the low NOx emission by the top hat nozzle 44, the manufacturing cost of the gas turbine combustor 12 can be reduced since the gas turbine combustor is easily manufactured owing to the regular arrangement thereof. Moreover, there is no need for a new configuration to be provided to suppress the combustion oscillation because the configuration of the top hat nozzle 44 itself suppresses the generation of combustion oscillation, the top hat nozzle achieving the low NOx. Therefore, there would not be a problem such as increase in the manufacturing cost of the gas turbine combustor 12 and increase in weight thereof.

Moreover, in the gas turbine combustor 12 according to the present embodiment, the top hat nozzle 44 has the vane form in the aspect of rectifying the compressed air (the combustion air) introduced to the air passage 30, includes the fuel ejection port 44a for ejecting the fuel, is provided in plurality in the circumferential direction, and is disposed such that the position of the fuel ejection port 44a in the direction to which the combustor axis S extends (the combustor axis direction) is varied irregularly.

According to the gas turbine combustor 12, in addition to the aforementioned effect that the combustion oscillation of a wide range of frequencies can be suppressed while maintaining the low NOx emission by the top hat nozzle 44, the suppression of the combustion oscillation of a wide range of frequencies can be prominently obtained as an effect because a greater number of the combustion oscillations of different frequencies would be present causing subtler phase differences in the frequencies of the combustion oscillations, whereby the combustion oscillation of a wider range of frequencies including the specific combustion oscillation can be suppressed. Moreover, there is no need for a new configuration to be provided to suppress the combustion oscillation because the configuration of the top hat nozzle 44 itself suppresses the generation of combustion oscillation, the top hat nozzle achieving the low NOx. Therefore, there would not be a problem such as increase in the manufacturing cost of the gas turbine combustor 12 and increase in weight thereof.

Moreover, in the gas turbine combustor 12 according to the present embodiment, the fuel ejection port 44a is disposed in plurality in the direction to which the combustor axis S extends (the combustor axis direction).

According to the gas turbine combustor 12, the suppression of the combustion oscillation of a wide range of frequencies can be prominently obtained as an effect because a greater number of the combustion oscillations with different frequencies would be present causing subtler phase differences in the frequencies of the combustion oscillations, whereby the combustion oscillation of a wider range of frequencies including the specific combustion oscillation can be suppressed.

Furthermore, according to the gas turbine including the gas turbine combustor 12 described in any one of the aforementioned first to fourth embodiments, the combustion oscillation of a wide range of frequencies can be suppressed while maintaining the low NOx emission by the gas turbine combustor 12, whereby the gas turbine can be operated with low NOx emission and less combustion oscillation.

REFERENCE SIGNS LIST 12 gas turbine combustor (combustor)
30 air passage
31 external cylinder
32 inner cylinder
33 transition piece
34 top hat part
35 pilot nozzle
36 main nozzle
41 top hat nozzle
41G top hat nozzle group
41a fuel ejection port
42 top hat nozzle
42a fuel ejection port
43 top hat nozzle
43a fuel ejection port
44 top hat nozzle
44a fuel ejection port
S combustor axis

The invention claimed is:

1. A gas turbine combustor comprising:
an external cylinder;
an inner cylinder provided inside the external cylinder to form an air passage between the external cylinder and the inner cylinder;
a pilot nozzle provided in a center part of the inner cylinder along a direction of a combustor axis;
a plurality of main nozzles provided on an inner peripheral surface of the inner cylinder along a circumferential direction thereof so as to surround the pilot nozzle, wherein the plurality of main nozzles are arranged to premix fuel with combustion air introduced to the air passage and eject the fuel into the inner cylinder; and
a plurality of top hat nozzles provided inside the air passage and including a plurality of fuel ejection ports, from which the fuel is ejected, across a circumferential direction to mix fuel with the combustion air prior to reaching the plurality of main nozzles, wherein the plurality of top hat nozzles are aligned on an axial plane perpendicular to the direction of the combustor axis, and wherein, with respect to every pair of circumferentially adjacent fuel ejection ports of the plurality of fuel ejection ports, the circumferentially adjacent fuel ejection ports of the plurality of fuel ejection ports have different axial positions along the combustion axis direction from each other.

2. The gas turbine combustor according to claim 1, wherein the axial positions of the plurality of fuel ejection ports are varied regularly along the circumferential direction.

3. The gas turbine combustor according to claim 2, wherein the plurality of fuel ejection ports having different axial positions constitute a fuel ejection port group, and plural fuel ejection port groups are disposed in the combustor axis direction.

4. The gas turbine combustor according to claim 1, wherein the axial positions of the plurality of fuel ejection ports are varied irregularly along the circumferential direction.

5. The gas turbine combustor according to claim 1, wherein the plurality of the top hat nozzles are provided in the circumferential direction, the top hat nozzles respectively include the fuel ejection ports provided midway in the combustor axis direction to which the respective top hat nozzles extend, and the respective fuel ejection ports are disposed in a manner that the axial positions of the fuel ejection ports are varied regularly along the circumferential direction.

6. The gas turbine combustor according to claim 5, wherein the top hat nozzles respectively have a plurality of the fuel ejection ports disposed in the combustor axis direction.

7. The gas turbine combustor according to claim 1, wherein the plurality of the top hat nozzles are provided in the circumferential direction, the top hat nozzles respectively include the fuel ejection ports provided midway in the combustor axis direction to which the respective top hat nozzles extend, and the respective fuel ejection ports are disposed in a manner that the axial positions of the fuel ejection ports are varied irregularly along the circumferential direction.

8. The gas turbine combustor according to claim 1, wherein the plurality of the top hat nozzles are provided in the circumferential direction, the top hat nozzles respectively have a vane shape for rectifying the combustion air introduced to the air passage, and the top hat nozzles respectively include the fuel ejection ports, and the respective fuel ejection ports are disposed in a manner that the axial positions of the fuel ejection ports are varied regularly along the circumferential direction.

9. The gas turbine combustor according to claim 8, wherein the top hat nozzles are respectively provided with a plurality of the fuel ejection ports disposed in the combustor axis direction.

10. The gas turbine combustor according to claim 1, wherein the plurality of the top hat nozzles are provided in the circumferential direction, the top hat nozzles respectively have a vane shape for rectifying the combustion air introduced to the air passage, and the top hat nozzles respectively include the fuel ejection ports, and the respective fuel ejection ports are disposed in a manner that the axial positions of the fuel ejection ports are varied irregularly along the circumferential direction.

11. A gas turbine comprising the gas turbine combustor according to claim 1.

* * * * *

UNITED STATES PATENT AND TRADEMARK OFFICE
CERTIFICATE OF CORRECTION

PATENT NO. : 9,719,419 B2
APPLICATION NO. : 13/817384
DATED : August 1, 2017
INVENTOR(S) : Satoshi Sometani et al.

It is certified that error appears in the above-identified patent and that said Letters Patent is hereby corrected as shown below:

On the Title Page

Change:
(73) Assignee: MITSUBISHI HEAVY INDUSTRIES, LTD., Tokyo (JP)

To be:
(73) Assignee: MITSUBISHI HITACHI POWER SYSTEMS, LTD., Tokyo (JP)

Signed and Sealed this
Twenty-fourth Day of July, 2018

Andrei Iancu
*Director of the United States Patent and Trademark Office*